June 21, 1949.  H. F. JACKSON ET AL  2,474,106
HEATING AND PRESSING COMB
Filed April 17, 1948
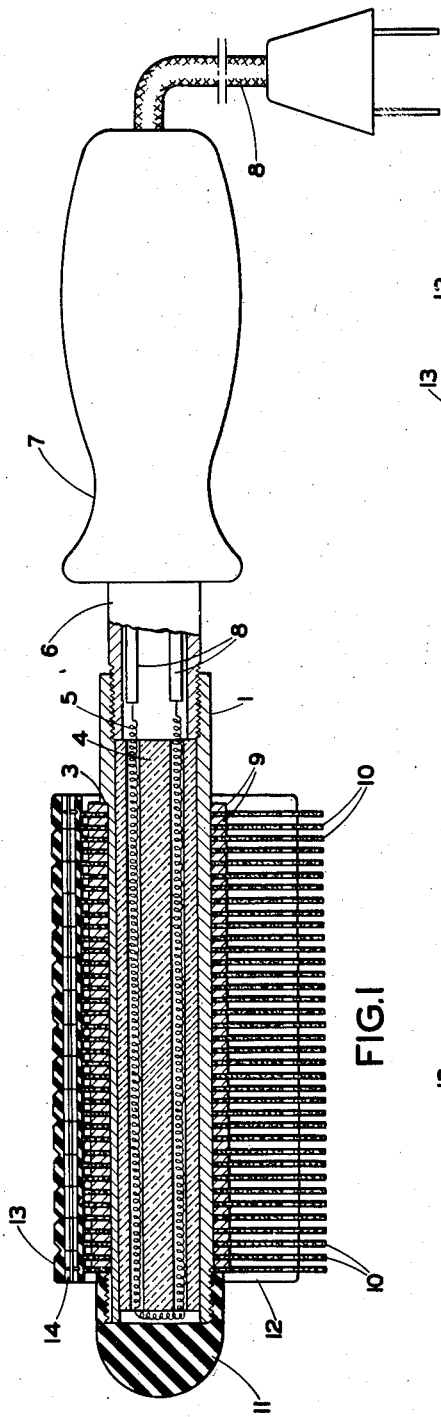
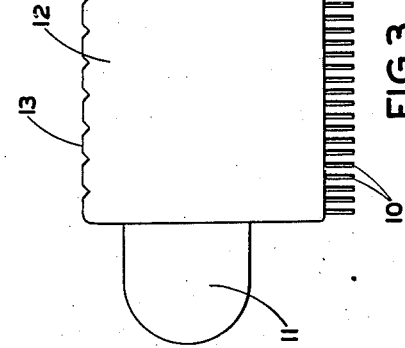
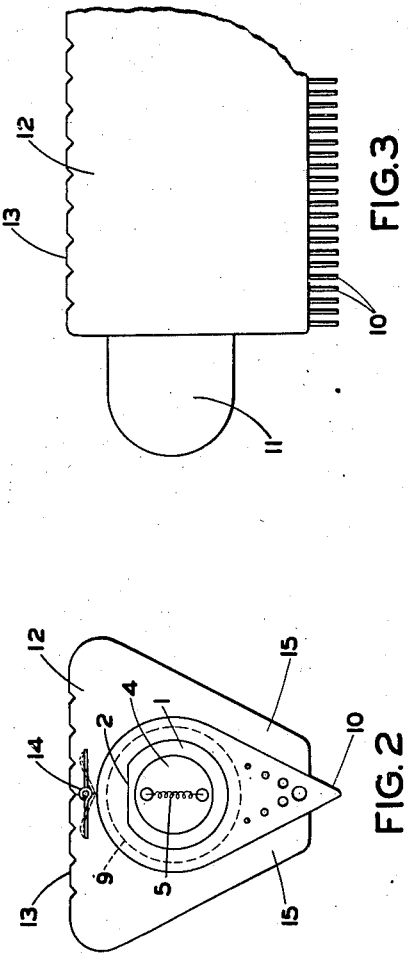
INVENTORS
Herman F. Jackson
Thomas F. Spencer
By Andrew K. Foulds
ATTORNEY Patented June 21, 1949

2,474,106

UNITED STATES PATENT OFFICE 2,474,106

HEATING AND PRESSING COMB

Herman F. Jackson and Thomas F. Spencer,
Detroit, Mich.

Application April 17, 1948, Serial No. 21,738

5 Claims. (Cl. 132—14)

This invention relates to new and useful improvements in a hair grooming device.

An object of the invention is to provide a device which may be readily disassembled for cleaning or repair.

Another object is to provide a device which is particularly adapted for heating hair while pressing or combing it without danger of scalp burns.

Another object is to provide a pressing attachment which can be readily added to a heating comb.

The invention consists in the improved construction and combination of parts to be more fully described hereinafter and the novelty of which will be particularly pointed out and distinctly claimed.

In the accompanying drawings to be taken as a part of this specification, there is clearly and fully shown a preferred embodiment of the invention, in which drawings:

Figure 1 is a view in vertical central section of the grooming device,

Fig. 2 is an end view with the clamping nut removed to show internal construction, and Fig. 3 is a fragmentary side view.

Referring to the drawings by characters of reference, the numeral 1 designates a tubular metal supporting member having a longitudinally extending external flat or flattened portion 2 providing a shoulder 3. Within the member 1, there is an electric heating element 4, preferably a ceramic rod which is longitudinally apertured for looping therethrough a resistance coil 5. The ceramic rod preferably abuts a handle member 6 having a hand grip 7 of heat insulating material. The conductor wires 8 for the coil 5 extend through the handle member 6. Fitting on the supporting member 1 are alternate metal washers or spacers 9 and comb teeth 10 which are of both a non-electrical conducting and a heat insulating sheet material such as sheet fibre. The spacers 9 and teeth 10 have a portion of their apertures flattened to conform to the flat on the member 1 so that they are held against rotary movement and have a segment abutting the shoulder 3. The teeth are clamped in position and against the shoulder 3 by a nut 11 of electric and heat insulating material which is screw-threaded onto the supporting member 1. The teeth 10 are of substantially triangular form, each having its side edges converging to an apex from adjacent its supporting member receiving aperture. Along its side edges and adjacent its apex, each tooth is perforated or apertured to reduce heat conduction to the scalp engaging edges. The heating element is so related to the extended surface formed by the teeth that the temperature of the spacers 9 will preferably not exceed about 360 degrees F. and the temperature of the tips of the apex portions of the teeth 10 will be about 90 degrees F.

Cooperable with the comb, is a pressing pad 12 of flexible material such as synthetic rubber or it may be layers of canvas stitched or otherwise held together. The pad 12 is hollow or tubular so as to surround and conform to the edges of the comb teeth; but has a longitudinal slot through which the apexes of the teeth project. The pad is also, in end elevation, of truncated triangular form with the slot through its smaller base. Its larger base forms a pressing surface 13 which, when of synthetic material, may be grooved in grid pattern. In order to removably support the pad on the comb, the pad is preferably spring hinged as at 14 so that the pad halves are resiliently held against the teeth side edges. It will be apparent, however, that sufficient flexing may also be had without the hinge 14, to permit opening of the slot and sleeving of the pad onto the comb.

In operation, the comb is preferably used for long abundant hair without the pad 12. If it is then desired to press the hair the pad may be readily snapped in place. In grooming short hair, the pad is left on the comb, the short projecting portions of the comb being of sufficient length. Short hair is pressed by engaging it between the scalp and the heated pad surface 13. It should also be noted that simultaneous combing and pressing can be accomplished by engaging either of the pad portions 15 with the scalp.

Having thus described the invention, what is claimed and desired to be secured by Letters Patent of the United States is:

1. A grooming device comprising a tubular supporting member, electric heating means in said member, a plurality of sheet material teeth of poor heat conducting material and each having an aperture receiving said supporting member, spacer members on said supporting member and spacing said teeth from each other, means on said supporting member tightly clamping said teeth and spacer members together, and means holding said teeth against rotary movement.

2. A grooming device comprising a tubular supporting member, electric heating means in said member, a plurality of sheet material teeth of poor heat conducting material and each having an aperture receiving said supporting member, each of said teeth having its side edges converging to an apex from adjacent its aperture, spacer members on said supporting member and spacing said teeth from each other, means on said supporting member tightly clamping said teeth and spacer members together, and means holding said teeth against rotary movement.

3. A grooming device comprising a tubular supporting member, electric heating means in said member, a plurality of sheet material teeth of poor heat conducting material and each having an aperture receiving said supporting member, each of said teeth having its side edges converging to an apex from adjacent its aperture, and each having a plurality of apertures adjacent its side edges and apex to reduce heat conduction thereto, spacer members on said supporting member and spacing said teeth from each other, means on said supporting member tightly clamping said teeth and spacer members together, and means holding said teeth against rotary movement.

4. A grooming device comprising a tubular supporting member, electric heating means in said member, a plurality of sheet material teeth of poor heat conducting material and each having an aperture receiving said supporting member, spacer members on said supporting member and spacing said teeth from each other, a nut of heat insulating material screw threaded on said supporting member tightly clamping said teeth and spacer members together, and cooperable flattened portions on said teeth and supporting member holding said teeth against rotary movement.

5. A grooming device comprising a tubular supporting member, electric heating means in said member, a plurality of sheet material teeth rigidly mounted on said supporting member, and a pressing pad surrounding said teeth.

HERMAN F. JACKSON.
THOMAS F. SPENCER.

REFERENCES CITED

The following references are of record in the file of this patent:

UNITED STATES PATENTS

| Number | Name | Date |
|---|---|---|
| 763,012 | Miller | June 21, 1904 |
| 854,498 | Higgins | May 21, 1907 |
| 862,101 | Oswald | July 30, 1907 |
| 917,680 | Taylor | April 6, 1909 |
| 952,732 | Gonce | Mar. 22, 1910 |
| 1,052,097 | Schwartz | Feb. 4, 1913 |
| 1,706,583 | Meyer | Mar. 26, 1929 |